United States Patent
Hattori et al.

(10) Patent No.: US 7,212,894 B2
(45) Date of Patent: May 1, 2007

(54) OCCUPANT DETECTING DEVICE

(75) Inventors: Katsu Hattori, Aichi-ken (JP); Toshiro Maeda, Anjo (JP); Yasuaki Hiraki, Nisshin (JP); Yukihiro Yamamoto, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 251 days.

(21) Appl. No.: 10/808,295

(22) Filed: Mar. 25, 2004

(65) Prior Publication Data

US 2004/0249536 A1 Dec. 9, 2004

(30) Foreign Application Priority Data

Mar. 25, 2003 (JP) ............................. 2003-082755

(51) Int. Cl.
*G06F 17/00* (2006.01)
(52) U.S. Cl. .................. 701/45; 180/273; 280/735
(58) Field of Classification Search ............... 701/45
See application file for complete search history.

(56) References Cited

U.S. PATENT DOCUMENTS 6,609,054 B2 * 8/2003 Wallace ..................... 701/45

FOREIGN PATENT DOCUMENTS

| JP | 2000-28366 | 1/2000 |
|---|---|---|
| JP | 2001-4469 | 1/2001 |
| JP | 2001180354 A | 7/2001 |
| JP | 2002-87132 | 3/2002 |
| JP | 2002-160571 | 6/2002 |
| JP | 2003-14564 | 1/2003 |
| WO | WO 99/38731 | 8/1999 |

* cited by examiner

*Primary Examiner*—Thu V. Nguyen
(74) *Attorney, Agent, or Firm*—Buchanan Ingersoll & Rooney PC

(57) ABSTRACT

An occupant detecting device comprises plural cells provided at a seating part of a vehicle seat and defined by an array of rows in a width direction of the vehicle seat and columns in a cross direction of the vehicle seat for detecting partial pressures of the seating part, a total pressure value calculating means for obtaining a total pressure value by summing up the detected partial pressures, a determining means for determining a condition of the vehicle seat on which an adult passenger is sitting based on a comparison result between the obtained total pressure value and a determining value threshold, a temperature sensor for detecting temperature, and a correcting means for correcting at least one of either the total pressure value calculated based on the detected temperature or the determining value threshold.

9 Claims, 15 Drawing Sheets

FIG. 8
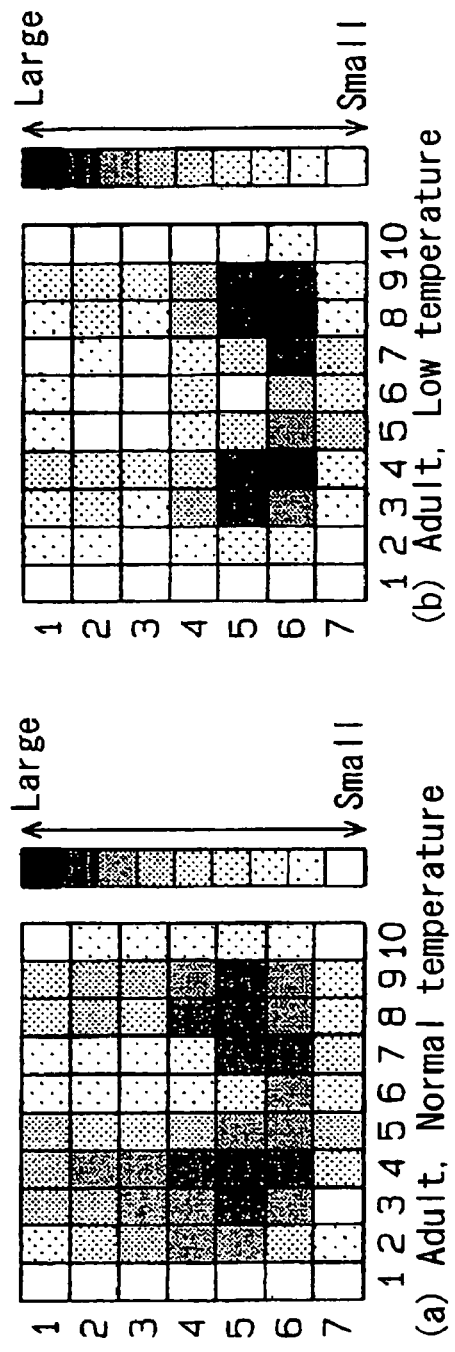
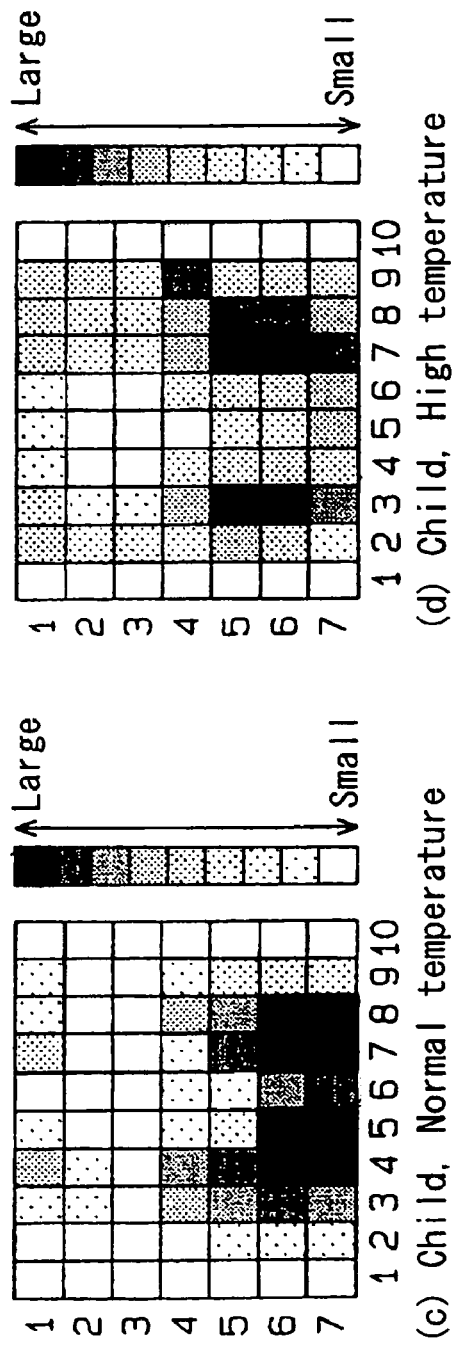

FIG. 12

FIG. 16
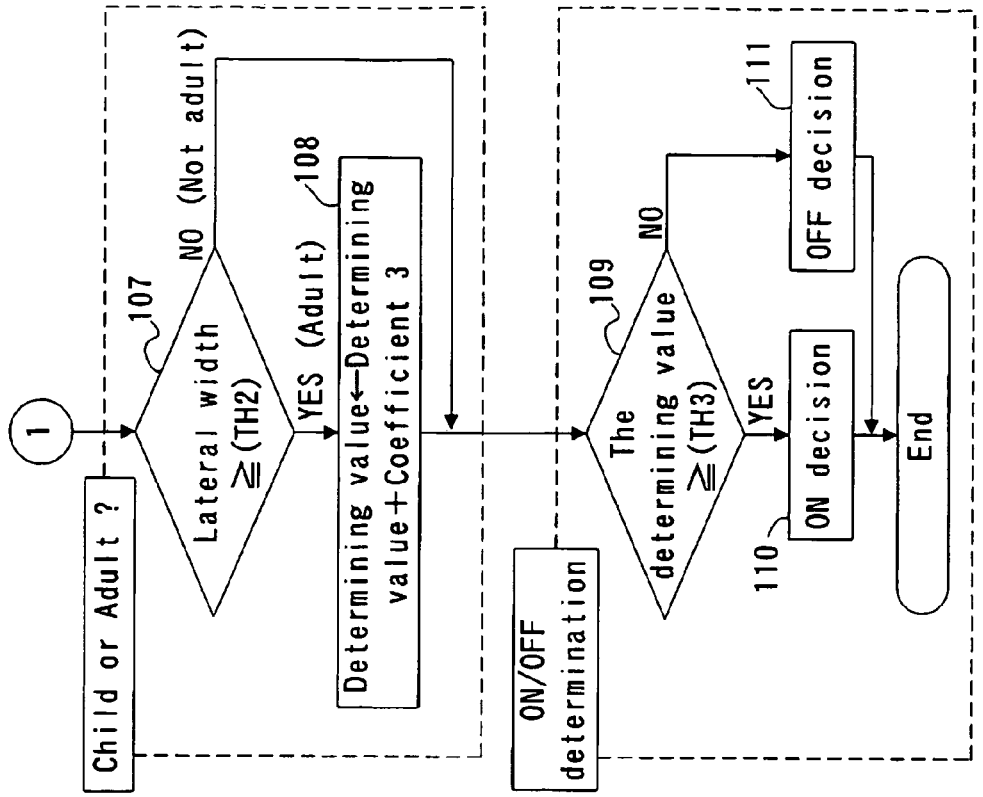
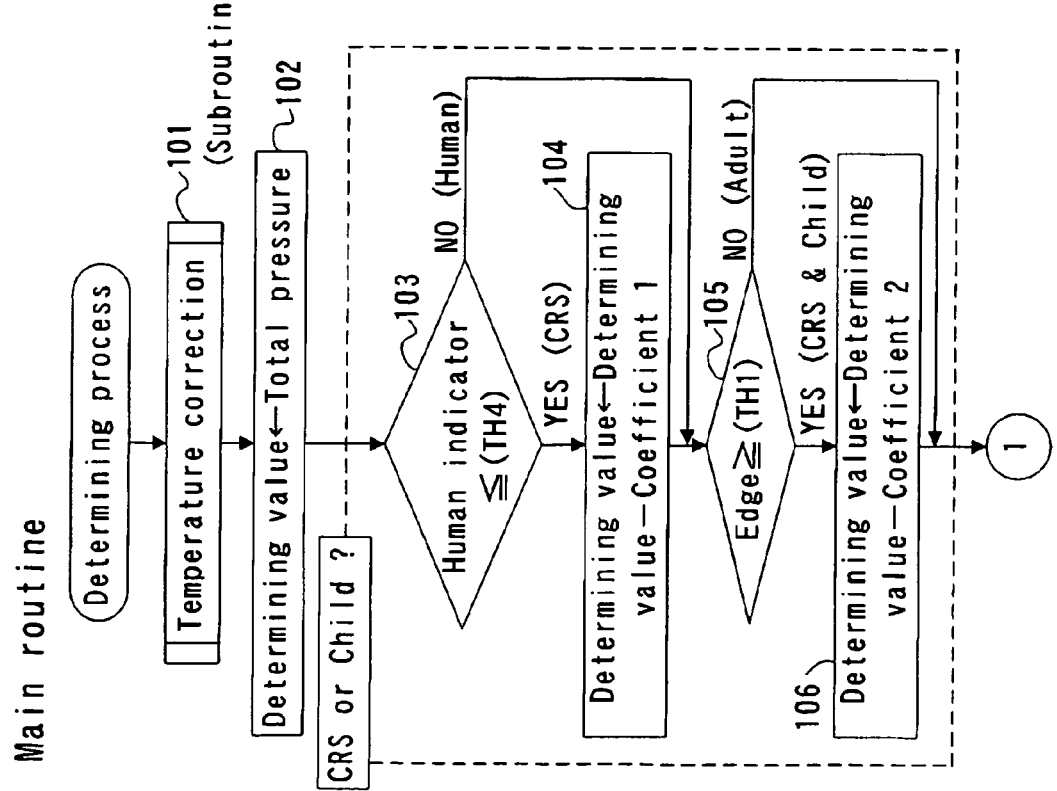

F I G. 20
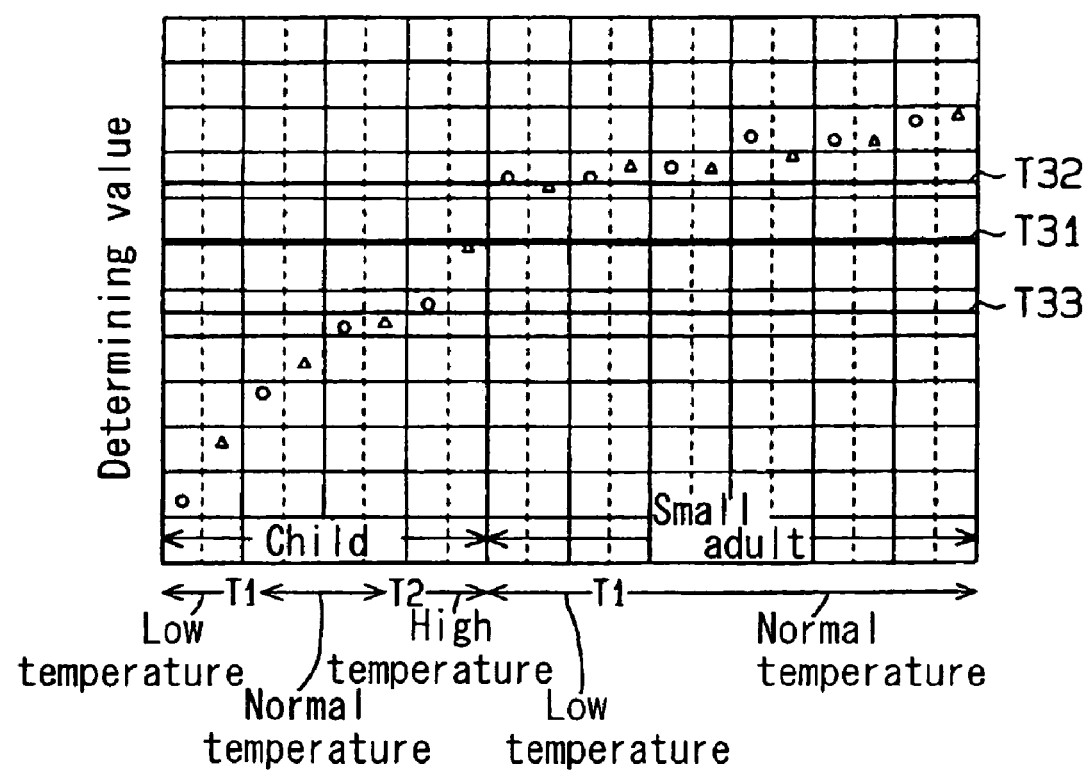

OCCUPANT DETECTING DEVICE

This application is based on and claims priority under 35 U.S.C. § 119 with respect to Japanese Application No. 2003-082755 filed on Mar. 25, 2003, the entire content of which is incorporated herein by reference.

FIELD OF THE INVENTION

This invention generally relates to an occupant detecting device. More particularly, the present invention pertains to a system for determining whether or not a passenger is sitting on the vehicle seat.

BACKGROUND OF THE INVENTION

Recently, a vehicle equips an air bag apparatus at front portion thereof (on a driver seat or on a passenger seat) for improving safety on a collision. When the vehicle crashes into an object due to an accident, the air bag apparatus outputs a signal (an operation signal) to an air bag actuator based on a signal from the collision detecting sensor for actuating an inflator and inflating the air bag instantaneously.

On this account, for improving the safety on the vehicle collision, a vehicle having a function for switching a place where the air bag is inflated considering a direction of the impact due to the vehicle collision has been on a market. In this case, the air bag needs to be actuated based on an accurate determination whether or not a passenger is sitting on the vehicle seat. The judge whether or not the passenger is sitting on the vehicle seat, especially on the passenger seat, needs to be done more precisely because such seat may be variously occupied by a adult, a children or a baby on a child seat (Child Restraint System, hereinafter referred to as CRS).

Various types of the occupant detecting devices for determining whether of not the passenger is sitting on the vehicle seat have been disclosed so far. For example, an occupant detecting device including plural cells at the seating surface thereof for detecting a partial pressure applied to a certain point of the vehicle seat where is defined by a matrix in a two-dimensional array of rows extending in a width direction of the vehicle seat and columns extending in a cross direction of the vehicle seat as disclosed in a Japanese Patent Laid-Open Publication No.2002-87132.

Such occupant detecting device tends to be affected by temperature, so that occupant detecting devices need to be able to correct such influences. For example, according to Japanese Patent Laid-Open Publications No.2001-4469, No.2000-28366 and No.2003-14564, temperature detecting element is embedded in a pressure sensor applied to the occupant detecting device, and sensitivity and a characteristic of the pressure sensor being affected by temperature can be corrected depending on the detected temperature by the element. Further, according to a Japanese Patent Laid-Open Publication No.2002-160571, an estimated weight obtained based on a sensor signal for determining the seat condition may be corrected. Specifically, based on a detected value of the temperature sensor, a characteristic curve is selected, and a correction factor for the weight estimation is determined.

In such known occupant detecting devices, the pressure detected by the pressure sensor is corrected in consideration of such characteristic of the pressure sensor being affected by temperature change; however, influences due to the temperature may differ when the occupant detecting device is actually embedded inside the vehicle seat. For example, when the occupant detecting device is embedded at a urethane pad in the vehicle seat, the pressure sensor may be affected by a hardness change of the urethane pad as well as the aforementioned characteristic of the pressure sensor being influenced from temperature change.

The known occupant detecting devices have not considered possible influences due to the temperature change on mounted condition in the vehicle seat, such as the influence of the hardness of the urethane pad and the like. The present invention therefore seeks to provide an occupant detecting device for improving the accuracy of determining a condition of the vehicle seat on mounted condition in the vehicle seat in spite of the effect of temperature.

SUMMARY OF THE INVENTION

According to an aspect of the present invention, an occupant detecting device comprises plural cells provided at a seating part of a vehicle seat and defined by an array of rows in a width direction of the vehicle seat and columns in a cross direction of the vehicle seat for detecting partial pressures of the seating part, a total pressure value calculating means for obtaining a total pressure value by summing up the detected partial pressures, a determining means for determining a condition of the vehicle seat on which an adult passenger is sitting based on a comparison result between the obtained total pressure value and a determining value threshold, a temperature sensor for detecting temperature, and a correcting means for correcting at least one of either the total pressure value calculated based on the detected temperature or the determining value threshold.

According to another aspect of the present invention, an occupant detecting device comprises plural cells provided at a seating part of a vehicle seat and defined by an array of rows in a width direction of the vehicle seat and columns in a cross direction of the vehicle seat for detecting partial pressures of the seating part, a total pressure value calculating means for obtaining a total pressure value by summing up the detected partial pressures, an edge calculating means for obtaining an edge by summing up all differences between the partial pressure detected at each cell and an average partial pressure obtained by averaging the partial pressures detected at cells located next to each cell and dividing the obtained total difference by the total pressure value obtained by the total pressure value calculating means, a determining means for determining a condition of the vehicle seat on which an adult passenger is sitting based on a comparison result between the obtained edge value and an edge threshold, a temperature sensor for detecting temperature, and a correcting means for correcting at least one of either the obtained edge calculated based on the detected temperature or the edge threshold.

According to still another aspect of the present invention, an occupant detecting device comprises, plural cells provided at a seating part of a vehicle seat and defined by an array of rows in a width direction of the vehicle seat and columns in a cross direction of the vehicle seat for detecting partial pressures of the seating part, a peak row detecting means for calculating a total partial pressure in rows being continuing in column direction in a predetermined number, and defining any row in the array of rows having a maximum total as a peak row, a lateral width calculating means for calculating each total of the partial pressures of cells per column in the array of rows continuing in column direction in the predetermined number and having the maximum total, comparing the obtained total of the partial pressures per column to a predetermined width threshold per column, and obtaining the lateral width by counting the number of the column in which the total pressure exceeds the corresponding predetermined width threshold per column, a determining means for determining a condition of the vehicle seat on which an adult passenger is sitting based on a comparison result between the obtained lateral width and a lateral width threshold, a temperature sensor for detecting temperature, and a correcting means for correcting at least one of either the obtained lateral width calculated based on the detected temperature or the lateral width threshold, a deviation determining means for detecting a deviation of the pressure in the width direction applied to the vehicle seat, wherein the lateral width calculating means calculates the lateral width in reference to the width threshold being set at a position off by the deviation determined by the deviation determining means in the width direction of the vehicle seat.

According to still further aspect of the present invention, an occupant detecting device comprises plural cells provided at a seating part of a vehicle seat and defined by an array of rows in a width direction of the vehicle seat and columns in a cross direction of the vehicle seat for detecting partial pressures of the seating part, an "ON" cell number calculating means for obtaining an "ON" cell number by counting the number of the cells whose partial pressure exceeds a predetermined pressure, a determining means for determining a condition of the vehicle seat on which an adult passenger is sitting based on a comparison result between the obtained "ON" cell number and a determining threshold for "ON" cell number, a temperature sensor for detecting temperature, and a correcting means for correcting at least one of either the "ON" cell number obtained based on the detected temperature or the determining threshold for "ON" cell number.

In each configuration, the correcting means sets each threshold respectively in response to a range where the detected temperature is included.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

Figure 5:
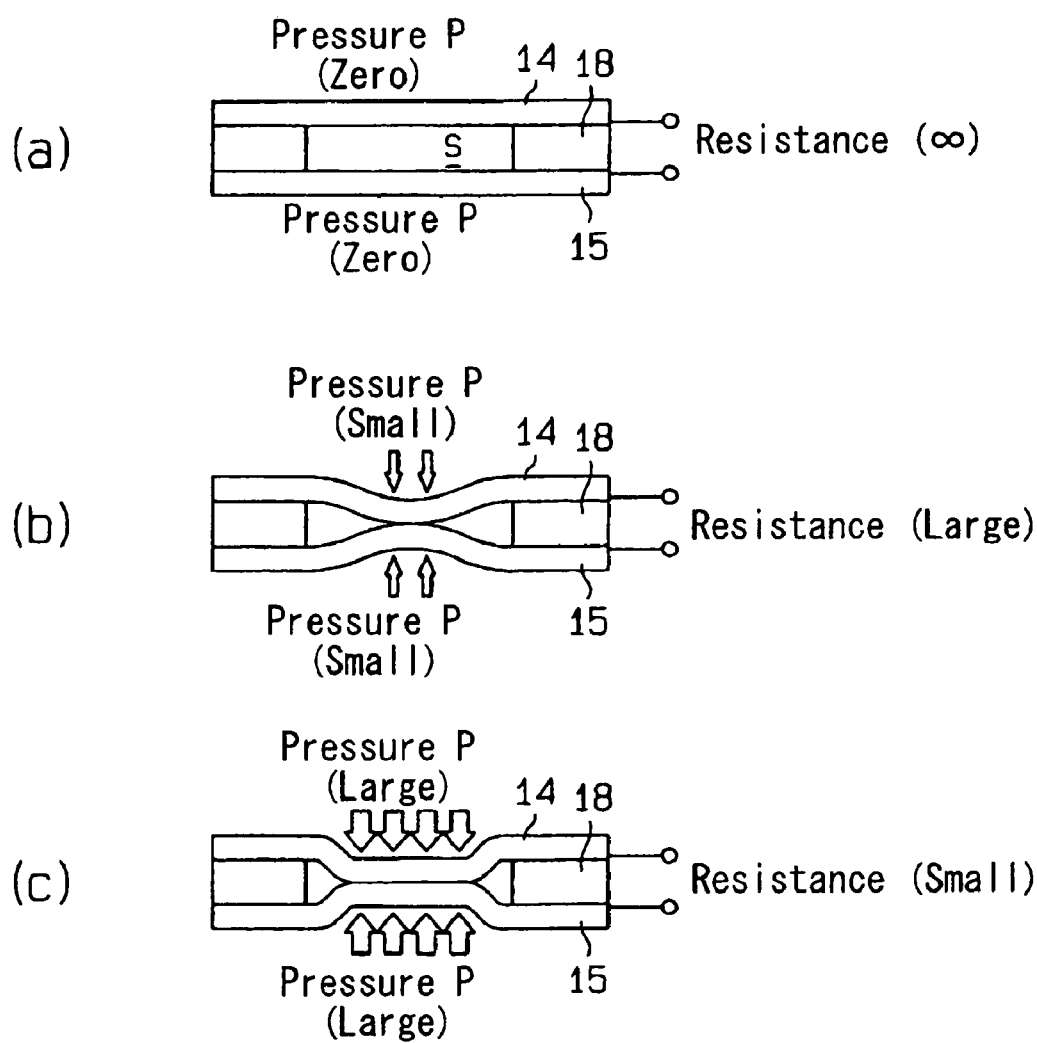
Figure 6:
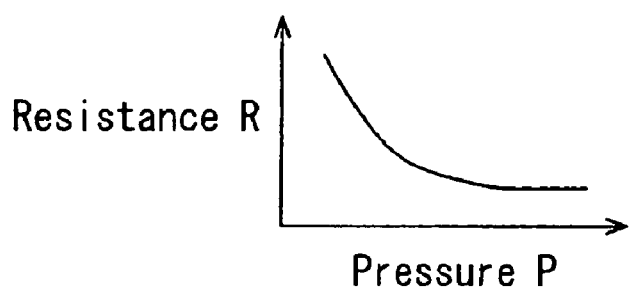
Figure 7:
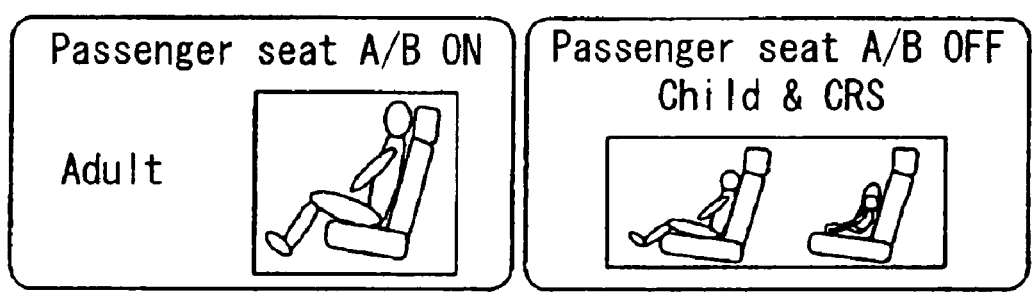
Figure 9:
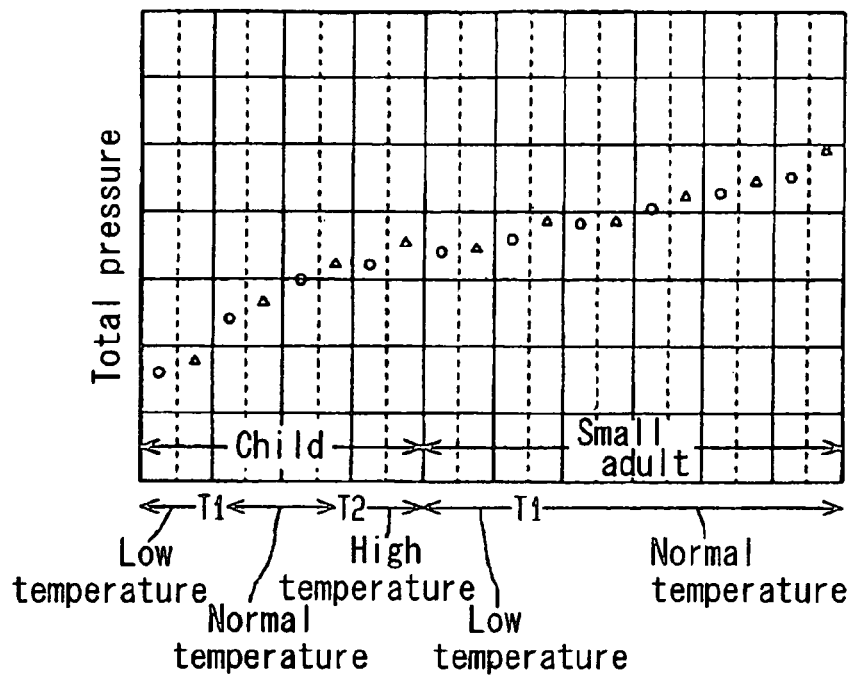
Figure 10:
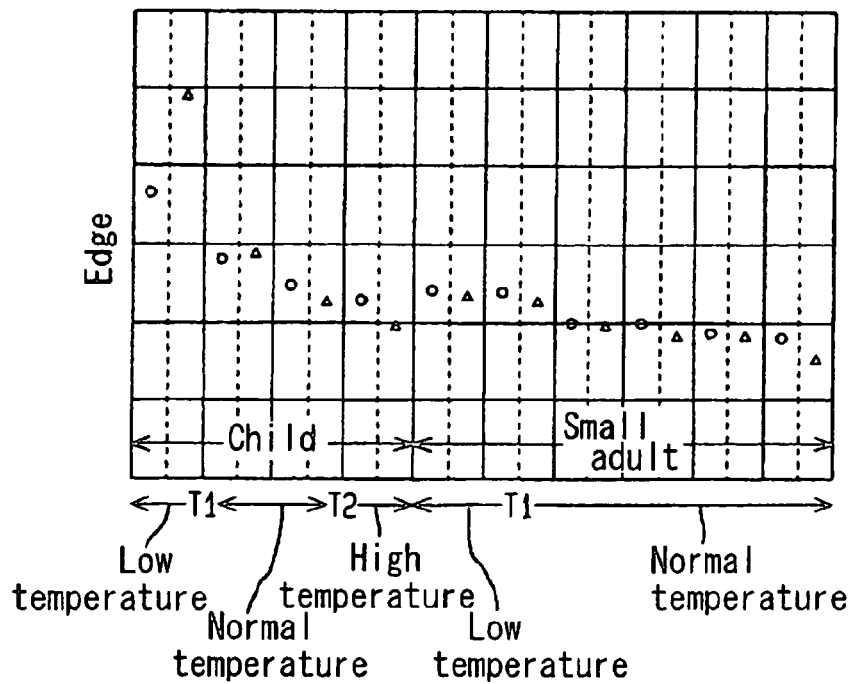
Figure 11:
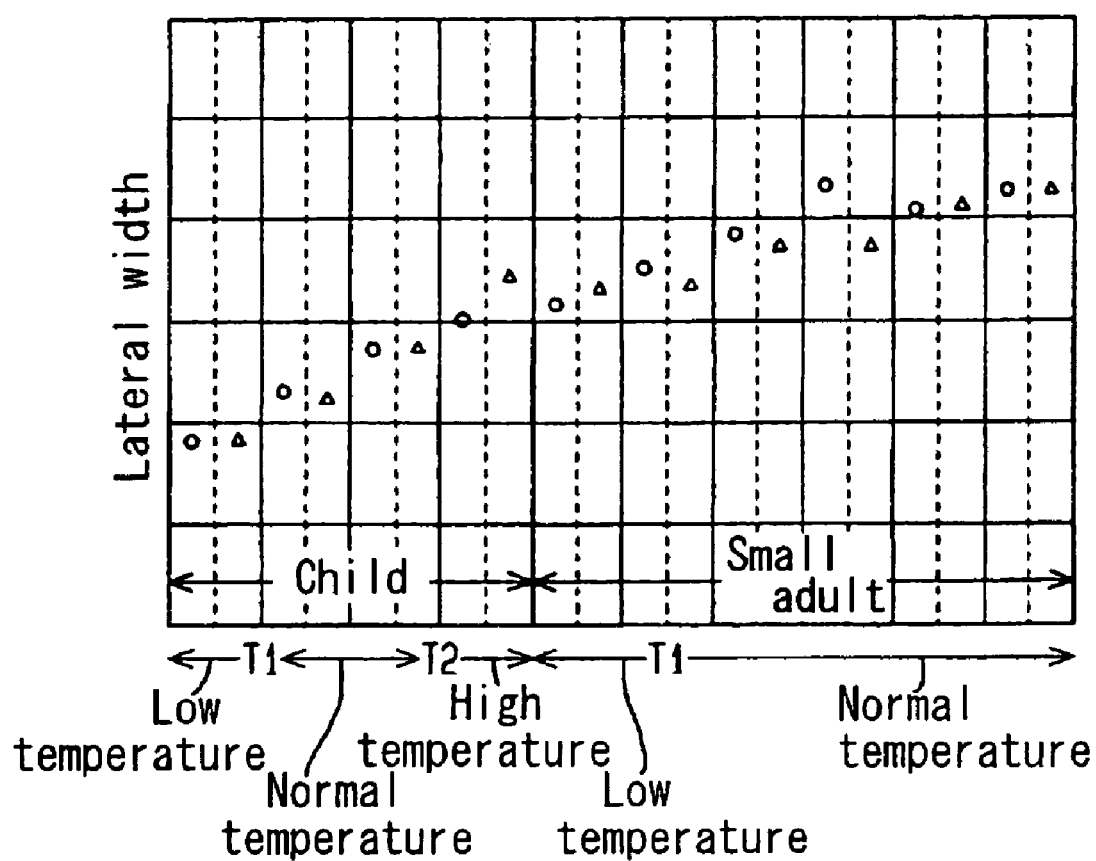
Figure 13:
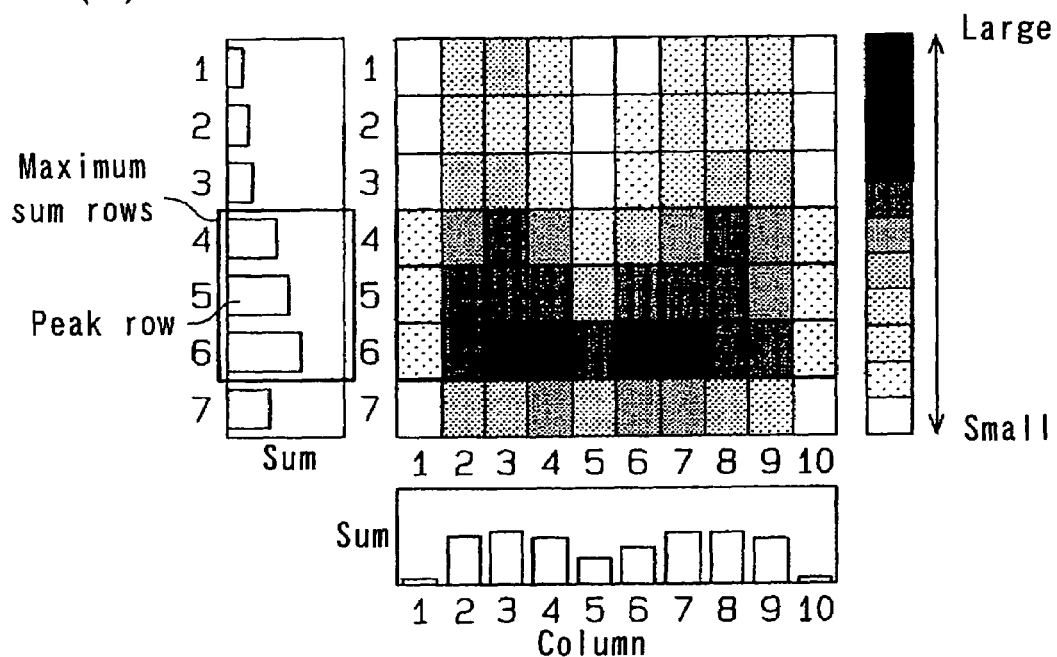
Figure 14:
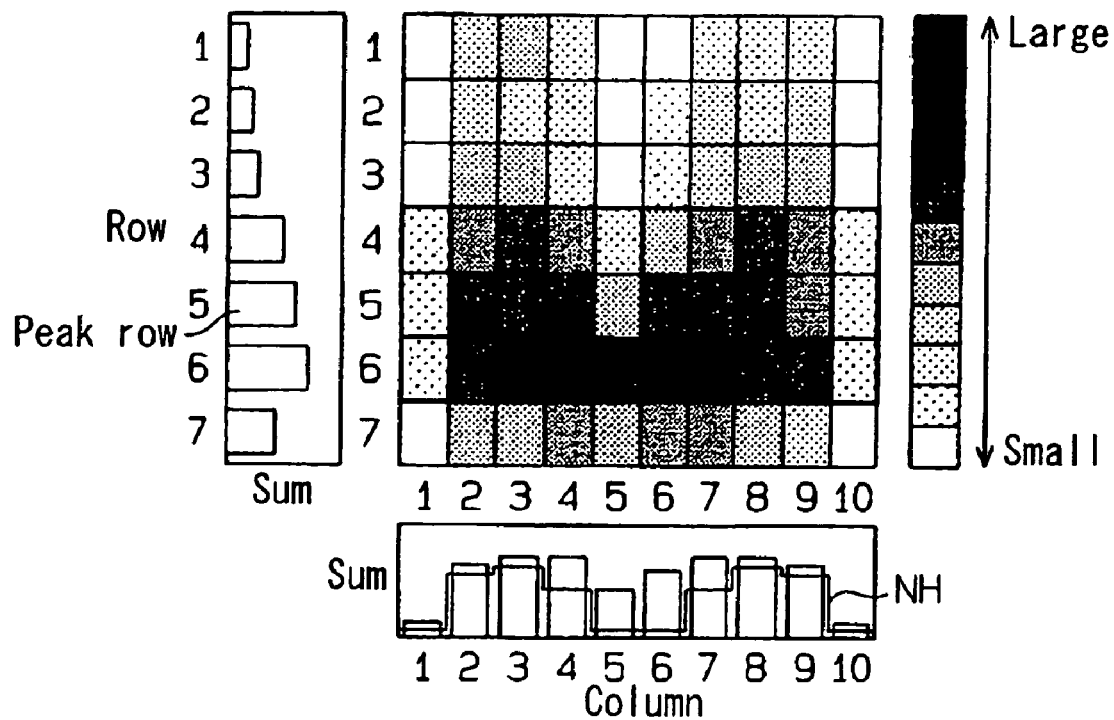
Figure 15:
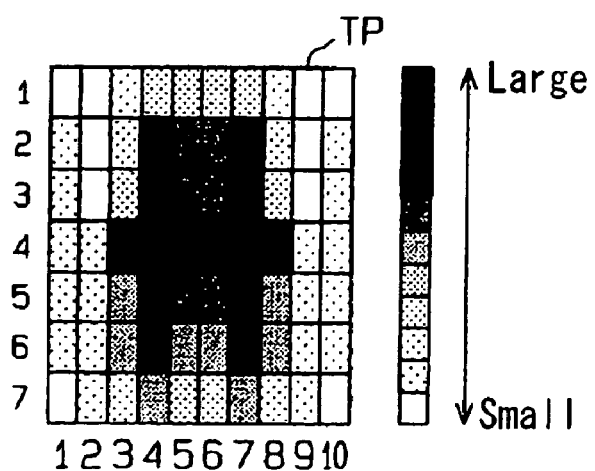
Figure 17:
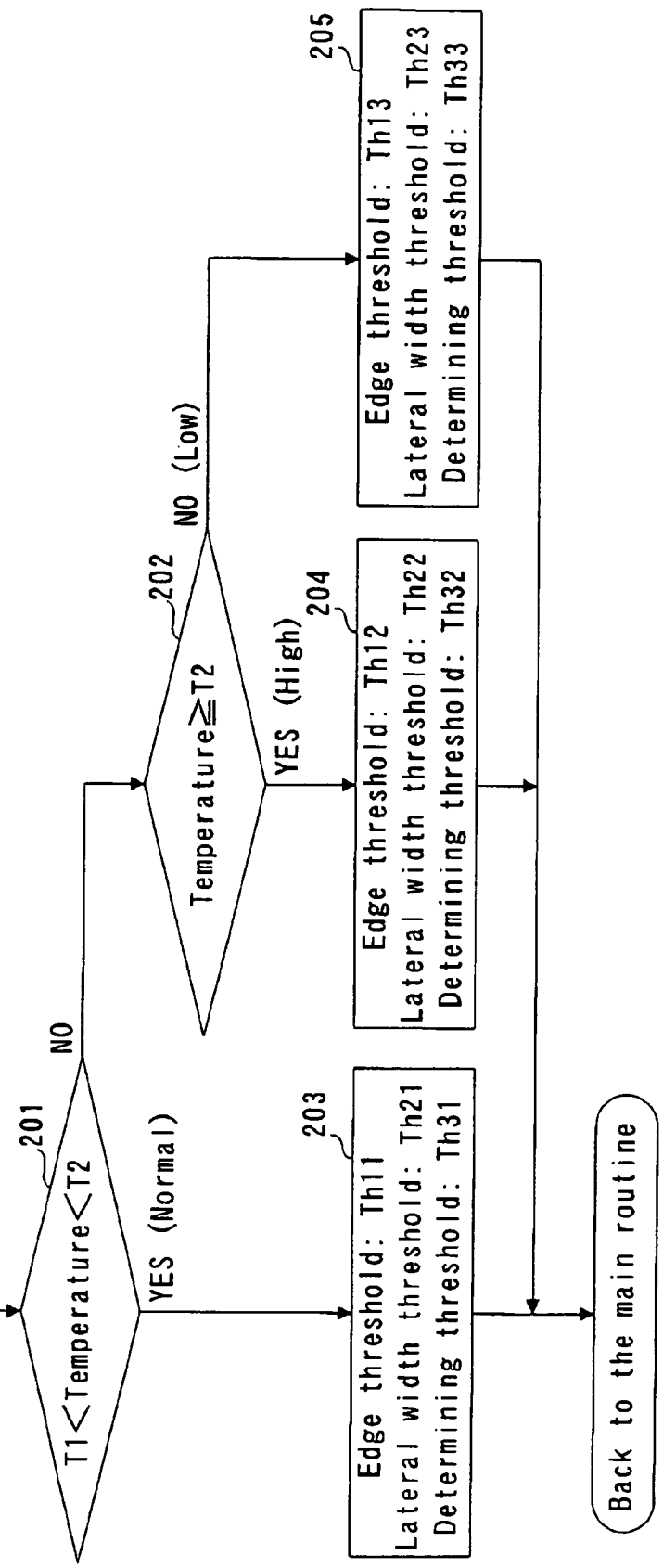
Figure 18:
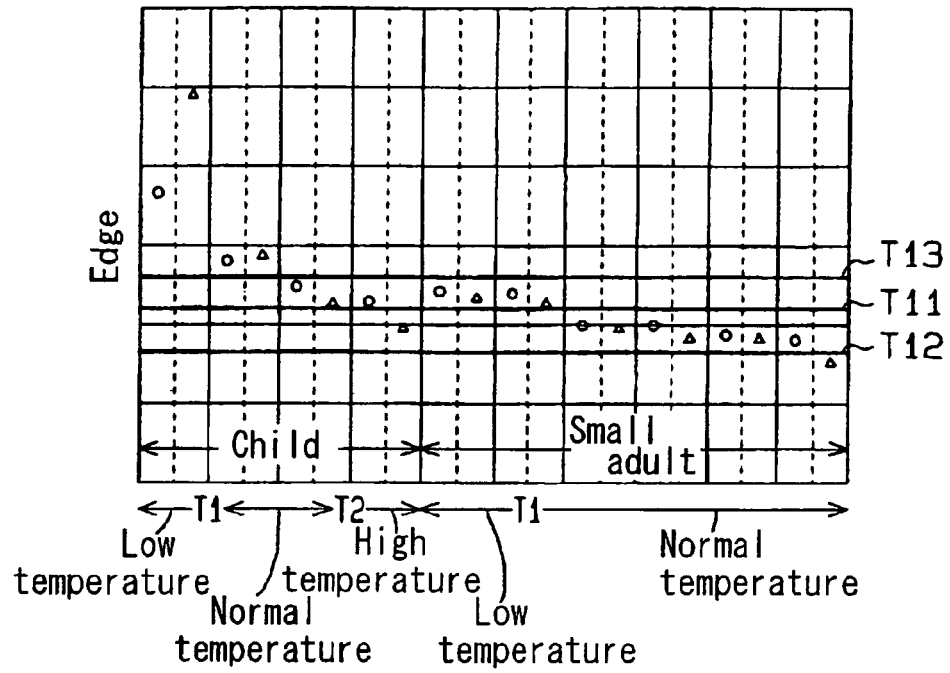
Figure 19:
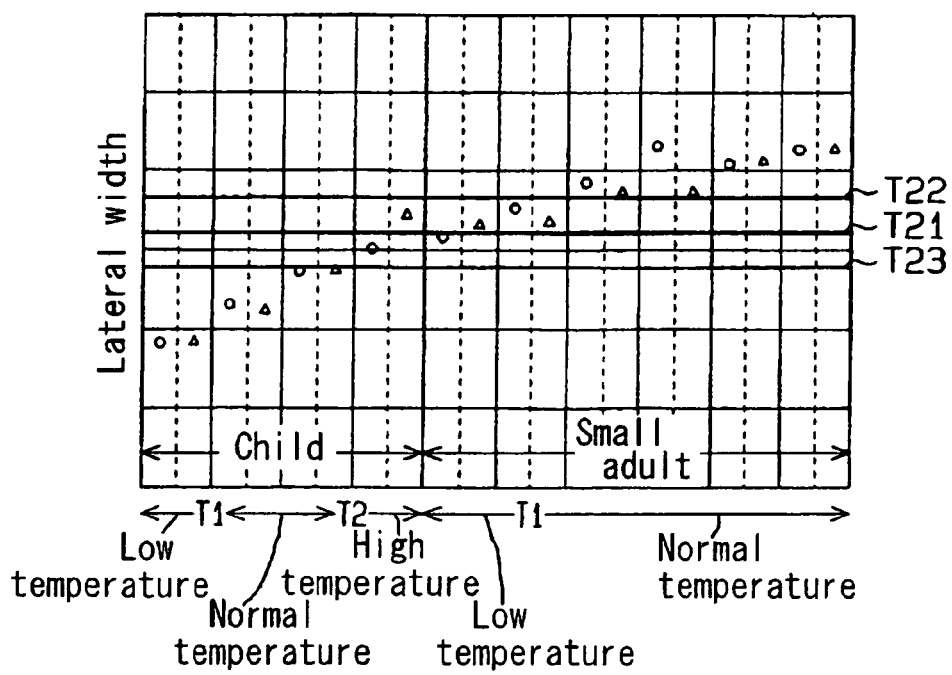

FIGS. 5 (a), (b) and (c) illustrate explanation diagrams of a performance of the cell;

FIG. 6 illustrates a graph indicating a relationship between a pressure of the cell and the resistance of the cell;

FIG. 7 illustrates an explanation diagram indicating a determination of an actuation of a passenger-side air bag;

FIGS. 8(a)–(d) illustrate pressure distribution maps showing a detected results at the pressure sensor;

FIG. 9 illustrates a graph showing an experimental result of a relationship between temperature and a total pressure;

FIG. 10 illustrates a graph showing an experimental result of a relationship between temperature and an edge;

FIG. 11 illustrates a graph showing an experimental result of a relationship between temperature and a lateral width;

Figure 12:
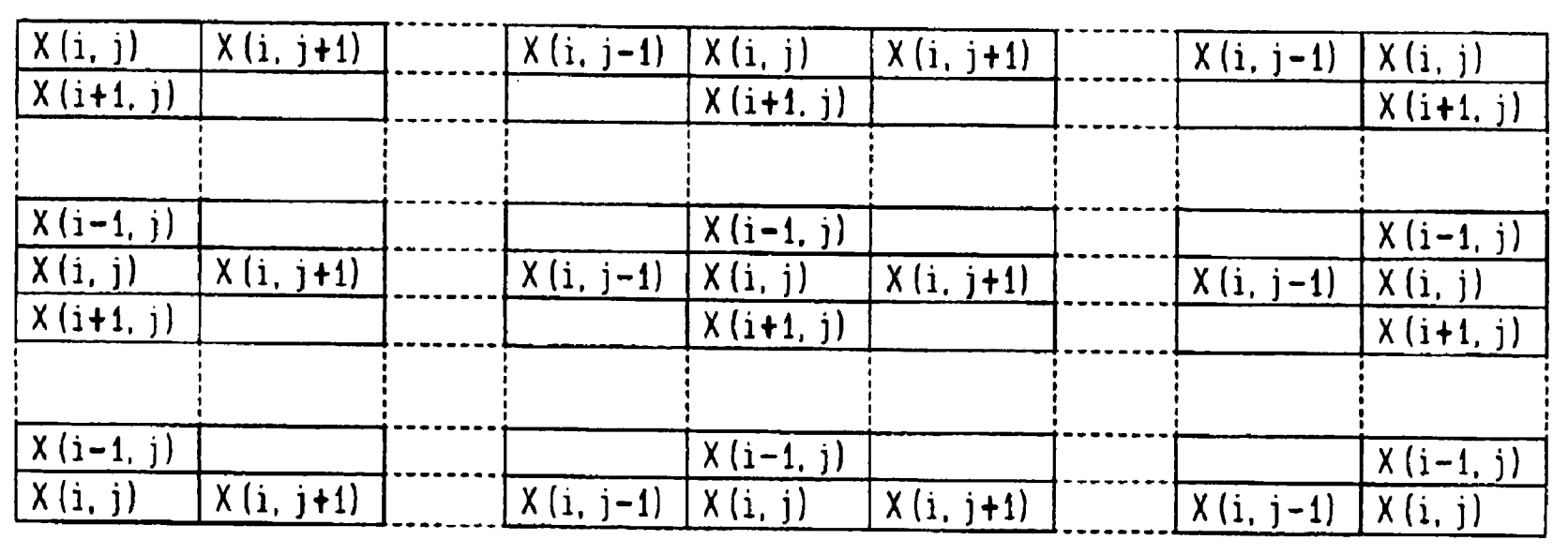

FIG. 12 illustrates an explanation view related to edge strength;

FIGS. 13 (a) and (b) illustrates explanation diagrams related to a peak pressure;

FIG. 14 illustrates an explanation diagram related to the lateral width;

FIG. 15 illustrates an explanation diagram related to a human indicator;

FIG. 16 illustrates a flow chart showing a determining process;

FIG. 17 illustrates a flow chart showing a part of the determining process;

FIG. 18 illustrates a graph indicating an edge threshold determined based on the relationship between temperature and the edge;

FIG. 19 illustrates a graph indicating a lateral width threshold determined based on the relationship between temperature and the lateral width, and FIG. 20 illustrates a graph indicating a determining value threshold determined based on the relationship between temperature and the determining value.

DETAILED DESCRIPTION OF THE INVENTION

A preferred embodiment of the present invention will be described hereinbelow in detail with reference to the accompanying drawings FIG. 1 through FIG. 17.

Figure 3:
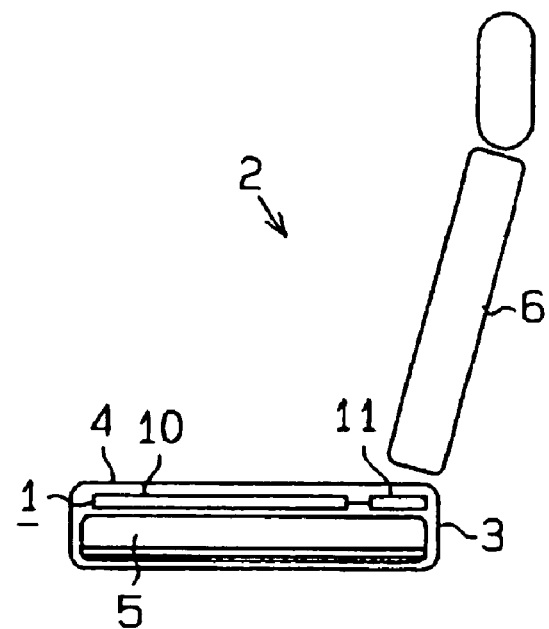
FIG. 3 illustrates a pattern diagram of the vehicle seat.

FIG. 3 illustrates a block diagram roughly showing a vehicle seat in which an occupant detecting device is embedded. The occupant detecting device 1 is embedded in a seat cushion 3 of a passenger seat and sandwiched between a seat cover 4 provided upper side of the seat cushion 3 and a urethane pad 5 provided at lower side of the seat cushion 3. Specifically, the occupant detecting device includes a pressure sensor 10 and a controller 11, and the pressure sensor 10 is housed in the vehicle seat 2 (the seat cushion 3) relative to a seating part thereof, and the controller 11 is housed in the vehicle seat 2 at rear end thereof near a seat back 6. Thus, a load (pressure) applied to the seat cushion is also applied to the pressure sensor 10 through the seat cover 4 and absorbed into the urethane pad 5.

Figure 1:
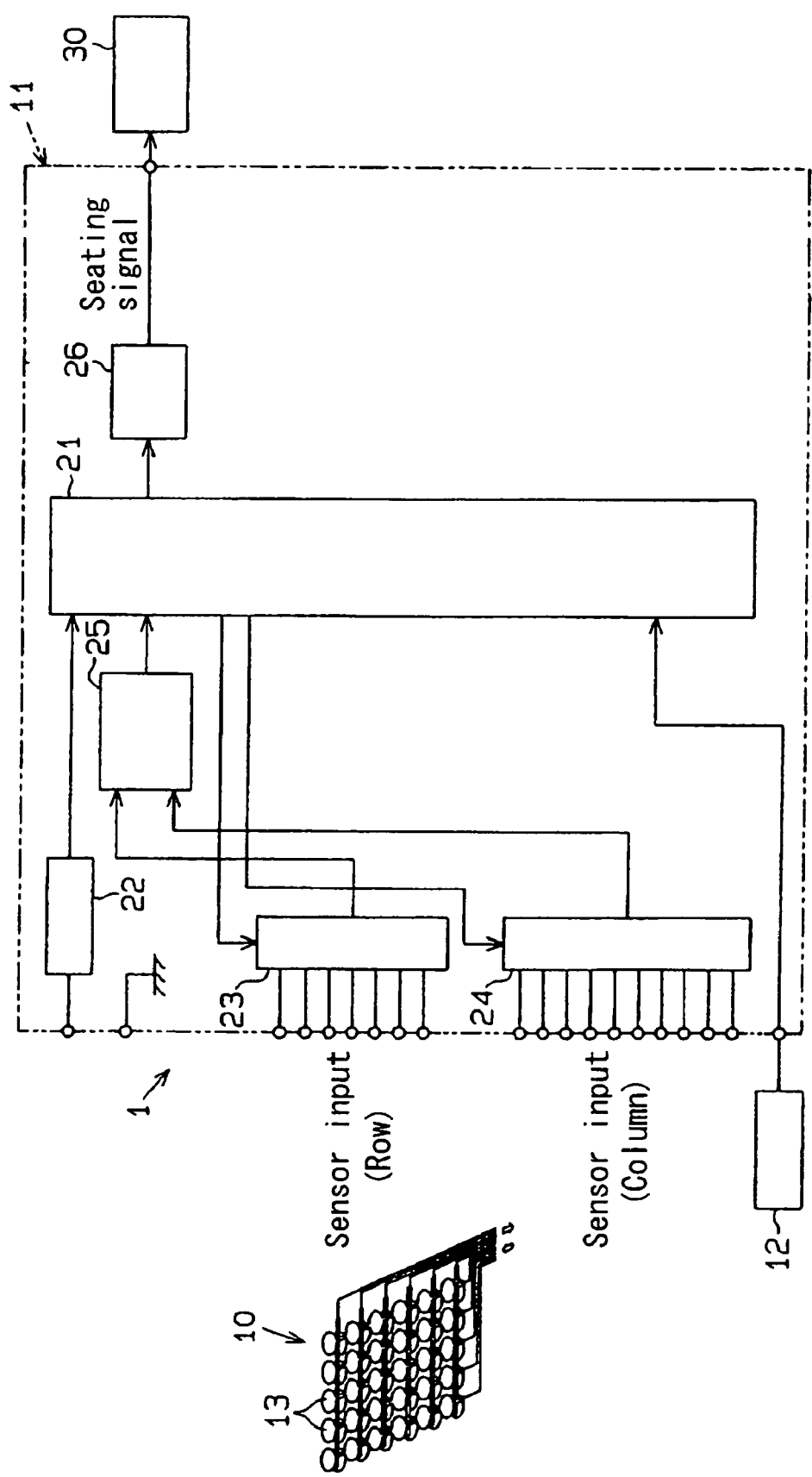
FIG. 1 illustrates a block diagram showing an electric configuration when an occupant detecting device is mounted to a vehicle.
Figure 2:
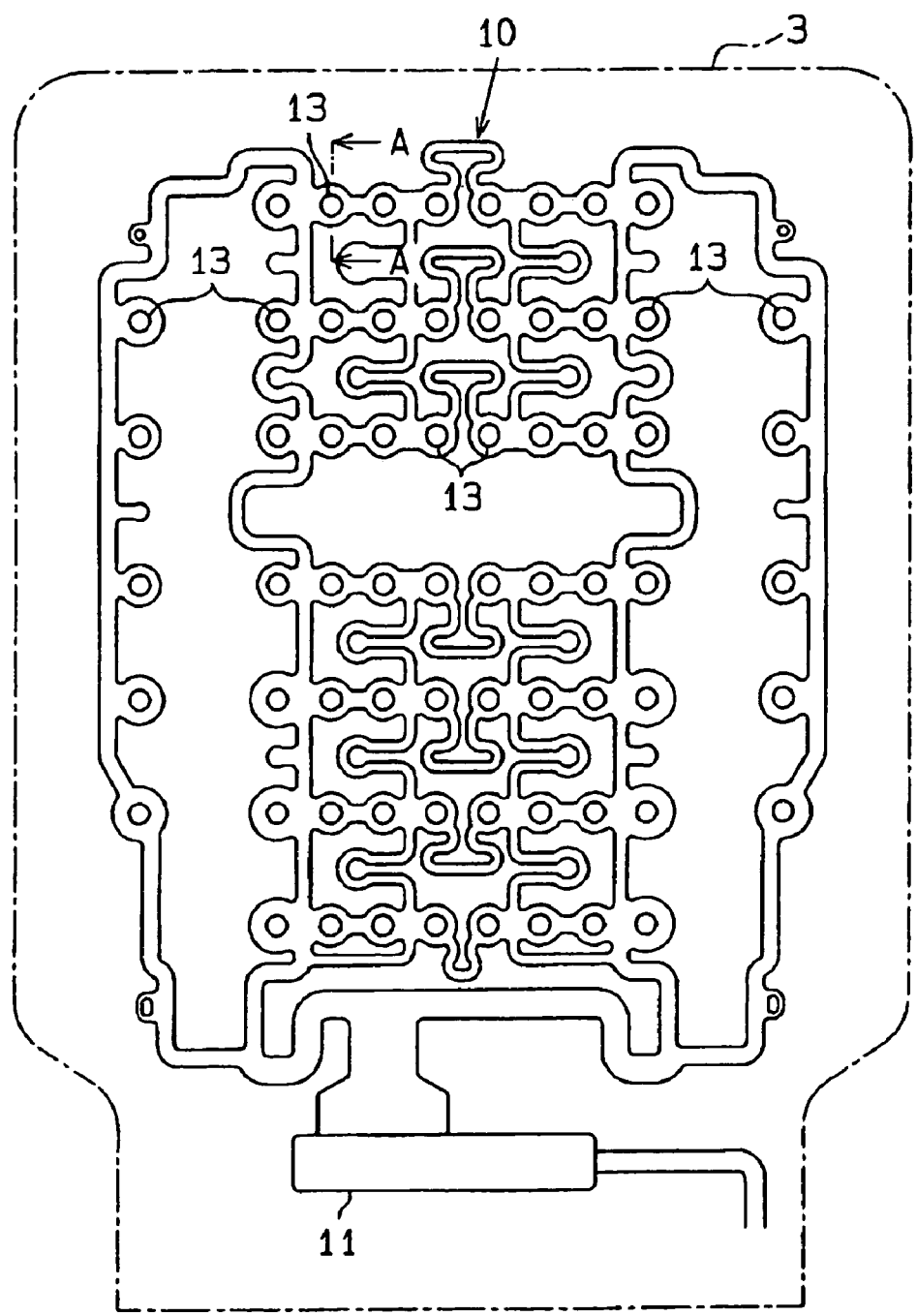
FIG. 2 illustrates a flat view of a pressure sensor.

FIG. 1 illustrates a block diagram indicating an electric configuration of the occupant detecting device 1, and FIG. 2 illustrates a flat view of the occupant detecting device 1. As shown in both FIG. 1 and FIG. 2, the pressure sensor 10 provided relative to the seating part of the vehicle seat 2 includes cells 13 for detecting the pressure applied to the seat cushion 3. Position of each cell 13 is defined by a two-dimensional array of rows in a width direction of the vehicle seat (i) and columns in a cross direction of the vehicle seat (j) (matrix structure). Each cell 13 provided at a certain position defined by such matrix structure detects a pressure (partial pressure) X (i, j) at the certain position. The detected partial pressure X (i, j) is input into the controller 11.

In the embodiment of the current invention, the partial pressures X (i, j) are detected by sixty-six cells 13 provided at the seating part of the vehicle seat 2 to be a 7×10 matrix array from which four cells at each corner are removed. Such configuration is one of the applicable examples, and the configuration of the occupant detecting device is not limited to the embodiment.

Figure 4:
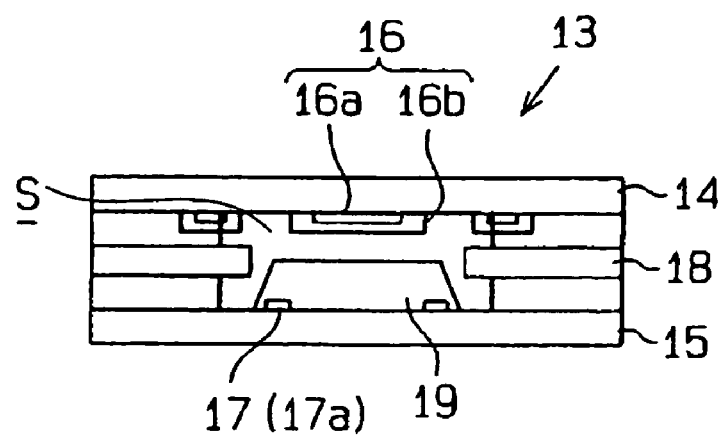
FIG. 4 illustrates a cross section view along a line A—A in FIG. 2.

The configuration of the cell 13 will be explained as follows. FIG. 4 illustrates a cross sectional view of the cell 13 along a line A—A in FIG. 2. As shown in FIG. 4, the cell 13 includes base films 14 and 15 made of, for example, polyethylene naphthalate (PEN), and provided upper and lower side thereof. Specifically, a silver electrode 16a and a carbon electrode 16b are screen-printed at the base film 14 relative to the each position of the cell 13. On the other hand, a silver electrode 17a is screen-printed at the base film 15 by screen-printing relative to the each position of the cell 13. A spacer 18 is provided around the silver electrode 16a, the carbon electrode 16b and the silver electrode 17a, and the silver electrode 16a and the carbon electrode 16b faces the silver electrode 17a across a space S formed between the base films 14 and 15. The spacer 18 made of polyethylene terephthalete (PET) is welded to both vase films 14 and 15 by means of, for example, an acrylic adhesion bond avoiding interferences with the electrodes 16 and 17. Pressure-sensitive ink 19 is printed over the silver electrodes 17.

FIG. 5 illustrate a pattern diagram explaining the operation of the cell 13 having aforementioned configuration. As shown in FIG. 5 (a), the base films 14 and 15 are separated by the spacer 18 while no load (no pressure P) is applied to the base films 14 and 15 (electrodes 16 and 17), so that a resistance R generated between the electrodes 16 and 17 becomes infinitely great. As shown in FIG. 5 (b), the electrodes 16 contact with the electrode 17 when the base film 14 and the base film 15 are elastically deformed due to a load (pressure P) applied thereto, as a result, the resistance R generated between the electrodes 16 and 17 is decreased. As shown in FIG. 5 (c), a contacting area between the electrodes 16 and the electrode 17 becomes larger as lager amount of load (pressure P) is applied to the base films 14 and 15 (electrodes 16 and 17), so that the resistance R generated between the electrodes 16 and 17 is further decreased.

In this way, the resistance R is in inverse proportion to the load (pressure P) applied to the cell 13 as shown in FIG. 6. Based on such character of the cell 13, the partial pressure X (i, j) whose position is defined by aforementioned matrix can be detected by corresponding cell 13.

As shown in FIG. 1, the controller 11 includes a CPU (central processing unit) 21, a power supply circuit 22, a first switching circuit 23, a second switching circuit 24, an A/D (analog/digital) convert circuit 25 and an output circuit 26. The CPU 21 determines the seating condition of the vehicle seat 2 (seat cushion 3) based on a controlling program and initial data stored in a ROM (read only memory) in advance. The power supply circuit 22 transforms a voltage of a power (e.g. 12V) provided from the battery (not shown) into a predetermined voltage (e.g. 5V) and supplies the transformed power to the CPU 21.

The first switching circuit 23 and the second switching circuit 24 being connected to the pressure sensor 10 selectively switch the rows and the columns of the pressure sensor 10 based on the switching signal from the CPU 21, and sequentially transmit the detected partial pressure X (i, j) into the AND convert circuit 25. The partial pressure X (i, j) being an analog signal is converted from into a digital signal at the A/D converts circuit 25. The CPU 21 stores each partial pressure X (i, j) in the memory respectively, and the partial pressure X (i, j) is used for determining the seating condition of the vehicle seat 2. Generally, possible conditions of the vehicle seat 2 on the passenger seat side may be a condition in which an adult passenger is sitting thereon, a condition in which a child passenger is sitting thereon and a condition in which a CRS is installed thereon, so that the CPU 21 classifies the condition of the vehicle seat 2 into two types, the condition in which the adult passenger is sitting thereon and the condition in which the child passenger is sitting or the CRS is installed thereon.

The occupant detecting device 1 in the embodiment includes a temperature sensor 12 provided, for example, relative to the vehicle seat 2. The temperature sensor 12 detects temperature of the surface of the seating part of the vehicle seat 2 and outputs a signal indicating the temperature into the CPU 21. The CPU 21 corrects the partial pressure used for determining the seating condition of the vehicle seat 2 based on the detected temperature of the seating part of the vehicle seat 2. The configuration of the temperature sensor is not limited to the embodiment of the current invention. The temperatures sensor 12 may be installed at a reference cell for temperature correction provided integrally with the pressure sensor 10 or provided at the controller 11.

One end of the output circuit 26 is connected to the CPU 21 for transmitting information of the seating condition of the vehicle seat 2 determined at the CPU 21. The other end of the output circuit is connected to an air bag ECU (electronic control unit) 30 for transmitting a seating signal indicating the seating condition of the vehicle seat 2 determined at the CPU 21 to the air bag ECU. As shown in FIG. 7, the seating signal transmitted into the air bag ECU 30 permits (turns on) an actuation of the air bag when the adult passenger is sitting on the passenger seat, and not permit (turn off) the actuation of the air bag when the child passenger is sitting or the CRS is installed on the passenger seat.

The air bag ECU 30 outputs a signal (operation signal) into an air bag actuator for actuating an inflator if needed based on the seating signal and a signal from a crash sensor, then the air bags on the driver seat and the passengers seat are inflated instantaneously. In this way, the actuation of the air bag of the passenger seat is preferably controlled based on the seating signal corresponding to the seating condition and the like of the vehicle seat 2.

FIG. 8 illustrates examples of experimental results of pressures (pressure distribution) detected by the pressure sensor 10 (cell 13) at the vehicle seat 2 on which a small adult passenger is sitting or a child passenger is sitting. FIG. 8 (a) illustrates a pressure distribution of the vehicle seat 2 on which the small adult passenger is sitting under normal temperature at which the temperature detected by the temperature sensor 12 is being between a predetermined temperature T1 and a predetermined temperature T2 (>T1). FIG. 8 (b) illustrates a pressure distribution of the vehicle seat 2 on which the small adult passenger is sitting under low temperature at which the temperature detected by the temperature sensor 12 is equal to or less than the predetermined temperature T1. FIG. 8 (c) illustrates a pressure distribution of the vehicle seat 2 on which the child passenger is sitting under normal temperature at which the temperature detected by the temperature sensor 12 is being between a predetermined temperature T1 and a predetermined temperature T2 (>T1). FIG. 8 (d) illustrates a pressure distribution of the vehicle seat 2 on which the child passenger is sitting under high temperature at which the temperature detected by the temperature sensor 12 is equal to or more than the predetermined temperature T2.

In each pressure distribution map in FIG. 8, a horizontal axis represents the width direction of the vehicle seat 2, and a vertical axis represents the cross direction of the vehicle seat 2. The position of the cell 13 is defined a combination of numbers allocated on each axis (row numbers and column numbers). In addition, an indicator provided at the right side of each pressure distribution map shows load level (partial pressure level) detected by each cell 13.

As shown in FIGS. 8 (a) and (c), there is an apparent difference between the pressure distribution of the vehicle seat 2 on which the small adult passenger is sitting and the pressure distribution of the vehicle seat 2 on which the child passenger is sitting under same circumstances (under normal temperature). On this account, the seating condition can be determined from these pressure distributions. In addition, it is found form the comparison between FIGS. 8 (*a*), (*c*) and FIGS. 8 (*b*), (*d*), that the pressure distributions may change under different circumstances even if the seating condition is the same.

According to the pressure distribution map when the small adult passenger is sitting on the vehicle seat 2 under low temperature, for example, each partial pressure X (i, j) detected by the cell 13 is low as a whole, however, partial pressure X (i, j) detected by the cell 13 provided near the area of the vehicle seat 2 at which ischial bone contacts is relatively high comparing to the pressure distribution map under normal temperature. This phenomenon is caused by a declination in the output of the pressure sensor 10 (cell 13) and hardening of the urethane pad due to low temperature. On the other hand, according to the pressure distribution map when the child passenger is sitting on the vehicle seat 2 under high temperature, each partial pressure X (i, j) detected by the cell 13 is high as a whole, however, partial pressure X (i, j) detected by the cell 13 provided near the area of the vehicle seat 2 at which ischial bone contacts is relatively low comparing to the pressure distribution map under normal temperature. This result is caused by an increase in the output of the pressure sensor 10 (cell 13) and softening of the urethane pad due to high temperature. Various data from which characteristics of the pressure distribution change become clear will be explained as follows.

FIG. 9 illustrates a graph of a test result of relationship between temperature and total pressure. The total pressure is obtained by summing up the partial pressures X (i, j) detected at cells 13 of the pressure sensor 10. The left side of the graph in FIG. 9 indicates experimental results of the total pressure of the vehicle seat 2 on which the child passenger is sitting, and the right side of the graph in FIG. 9 indicates experimental results of the total pressure of the vehicle seat 2 on which the small adult passenger is sitting. The total pressures are obtained on two different types of vehicle seats, and the passenger is sitting on teach vehicle seat in normal posture without leaning in a certain direction which may cause pressure unbalancing. Each result is shown in ○ and Δ. According to the graph in FIG. 9, the total pressure of the vehicle seat is increasing as the temperature rises regardless of the seating condition. In addition, it is also found that the total pressure of the vehicle seat on which the child is sitting under high temperature approximately equals to the total pressure of the vehicle seat on which the adult is sitting under low temperature. This phenomena result from an output of the pressure sensor 10 (cell 13) has been changed as temperature changes.

FIG. 10 illustrates a graph of a test result of relationship between temperature and the edge. The left side of the graph in FIG. 10 indicates experimental result of the total pressure of the vehicle seat 2 on which the child passenger is sitting, and the right side of the graph in FIG. 10 indicates experimental result of the total pressure of the vehicle seat 2 on which the small adult passenger is sitting. The edges are obtained on two different types of vehicle seats, and the passengers are sitting on each vehicle seat in normal posture without leaning in a certain direction which may cause pressure unbalancing. Each result is shown in ○ and Δ.

The edge vale is defined as follows. Generally, there is a significant pressure change between a partial pressure X (i, j) detected by a certain cell and a pressure X (i, j) detected by a cell provided next to aforementioned cell when the child passenger is sitting on the vehicle seat. This phenomena result from that the child passenger takes a small area to sit on the vehicle seat 2, and the pressure from the child passenger is intensively applied to the small area, so that significant differences have been found between each sensor of the vehicle seat 2. In addition, the CRS is structural and more rugged than the human body (e.g. hip), and fixed to the vehicle seat by a seat belt, so that the pressures applied to the sensors have significant differences. Thus, the condition of the vehicle seat on which the adult passenger is sitting and the condition of the vehicle seat on which the child passenger is sitting can be distinguished based on such pressure differences between each sensor, and the edge is obtained by quantifying the pressure difference as follows.

Firstly, a difference pressure ΔX (i, j) between each partial pressure X (i, j) detected at each cell 13 and an average of pressures detected at adjoining cells of the aforementioned cell 13 are obtained at every cell 13.

Specifically, the difference pressure ΔX (i, j) is calculated by the following formula.

$$\Delta X(i,j)=X(i,j)-(X(i-1,j)+X(i+1,j)+X(i,j-1)+X(i,j+1))/4$$

When the cell 13 is provided at left side peripheral portion of the vehicle seat 2 in the width direction thereof and adjoins only three cells, the difference pressure ΔX (i, j) is calculated by the following formula.

$$\Delta X(i,j)=X(i,j)-(X(i+1,j)+X(i-1,j)+X(i,j+1))/3$$

In addition, when the cell 13 is provided at right side peripheral portion of the vehicle seat 2 in the width direction thereof and adjoins only three cells, the difference pressure ΔX (i, j) is calculated by the following formula.

$$\Delta X(i,j)=X(i,j)-(X(i+1,j)+X(i-1,j)+X(i,j-1))/3$$

Further, when the cell 13 is provided at front side peripheral portion of the vehicle seat 2 in the cross direction thereof and adjoins only three cells, the difference pressure ΔX (i, j) is calculated by the following formula.

$$\Delta X(i,j)=X(i,j)-(X(i+1,j)+X(i,j+1)+X(i,j-1))/3$$

Furthermore, when the cell 13 is provided at rear side peripheral portion of the vehicle seat 2 in the cross direction thereof and adjoins only three cells, the difference pressure ΔX (i, j) is calculated by the following formula.

$$\Delta X(i,j)=X(i,j)-(X(i-1,j)+X(i,j+1)+X(i,j-1))/3$$

When the cell 13 is provided at the upper left corner of the vehicle seat and adjoins only two cells, the difference pressure ΔX (i, j) is calculated by the following formula.

$$\Delta X(i,j)=X(i,j)-(X(i+1,j)+X(i,j+1))/2$$

In addition, when the cell 13 is provided at the lower left corner of the vehicle seat and adjoins only two cells, the difference pressure ΔX (i, j) is calculated by the following formula.

$$\Delta X(i,j)=X(i,j)-(X(i-1,j)+X(i,j+1))/2$$

Further, when the cell 13 is provided at the upper right corner of the vehicle seat and adjoins only two cells, the difference pressure ΔX (i, j) is calculated by the following formula.

$$\Delta X(i,j)=X(i,j)-(X(i+1,j)+X(i,j-1))/2$$

Furthermore, when the cell 13 is provided at the lower right corner of the vehicle seat and adjoins only two cells, the difference pressure ΔX (i, j) is calculated by the following formula.

$$\Delta X(i,j)=X(i,j)-(X(i-1,j)+X(i,j-1))/2$$

A total edge strength value is obtained by summing up the all differences ΔX (i, j) calculated by aforementioned formulas. Then the edge is calculated by dividing the total edge strength value by the total pressure value.

Generally, the pressure difference between each cell 13 is relatively small when the adult passenger is sitting on the vehicle seat 2, however, the total edge strength value becomes larger because the pressure is applied to the wide area of the surface of the vehicle seat 2. On the other hand, the pressure difference between each cell 13 is relatively large when the child passenger is sitting or the CRS is installed on the vehicle seat 2, however, the total edge strength value becomes smaller because the pressure is applied to the small area of the surface of the vehicle seat 2. On this account, the total edge strength value when the child passenger is sitting or the CRS is installed on the vehicle seat 2 may equals to the total edge strength value when the adult passenger is sitting on the vehicle seat 2 depending on such difference of the contacting area and the characteristic of the pressure difference. To reduce such influences as a whole, the edge is calculated by aforementioned formula.

As shown in FIG. 10, the edge is increased as the temperature becomes lower on both conditions. It is also found from FIG. 10 that the edge when the child passenger is sitting or the CRS is installed on the vehicle seat under high temperature equals to the edge when the adult passenger is sitting on the vehicle seat under low temperature. This phenomena result from that the hardness of the urethane pad may be changed as the temperature change.

FIG. 11 illustrates a graph of test result of relationship between temperature and lateral width. The left side of the graph in FIG. 11 indicates experimental result when the child passenger is sitting on the vehicle seat 2, and the right side of the graph in FIG. 11 indicates experimental result when the adult passenger is sitting on the vehicle seat 2. The lateral width is obtained on two different types of vehicle seats, and the passengers is sitting on each vehicle seat in normal posture without leaning in a certain direction which may cause pressure unbalancing. Each result is shown in ○ and Δ. The definition of the lateral width and a peak row will be explained as follows referring to FIG. 13 and FIG. 14.

FIG. 13 (*a*) illustrates an example of a pressure distribution when the adult passenger is sitting on the vehicle seat 2, and the pressure distribution differs from the pressure distribution shown in FIG. 8. The peak row will be obtained as follows. Firstly, the all partial pressures in three continuing rows are summed up. In the pressure sensor 10 in the embodiment of the current invention, the cells 13 are arrayed in 7 rows and 10 columns, so that five different combinations of the three continuing rows are possible. In other words, five different total pressure amounts will be obtained. Each total pressure amounts are compared, and only one combination of the three continuing rows which has a largest pressure is selected. Then, the center row in such selected combination of the three continuing rows is defined as the peak row. In an example pressure distribution map shown in FIG. 13, a total pressure of the combination of the forth, fifth and sixth rows is the largest, so that the fifth row being center of the combination is defined as the peak row of the pressure sensor 10 (cell 13).

Next, the lateral width will be explained based on FIG. 14. FIG. 14 illustrates an example of a pressure distribution when the adult passenger is sitting on the vehicle seat 2 in the same way as FIG. 13 (*a*). The array of rows including the aforementioned peak row is embosomed in bold line as shown in FIG. 14, and each column in the array is hereinafter referred to as a peak column. Total of the partial pressures in each peak column are calculated. The total pressure of each peak column is compared to a corresponding predetermined width threshold NH, and a result is shown in a diagram provided below the pressure distribution map in FIG. 14. The width threshold NH has been set based on the pressure distribution of the peak column when the adult passenger is sitting on the vehicle seat in normal posture. When each total pressure of the peak column becomes equal to or more than the width threshold NH, the total pressure is added to a count number W1. The count number W1 is the lateral width. Thus, when the lateral width is large, the vehicle seat is more likely to be occupied by the adult passenger, and when the lateral width is small, the vehicle seat is more likely to be occupied by the child passenger or the CRS.

According to FIG. 11, it is apparently that the lateral width is increasing as the temperature is getting high on both conditions that the adult passenger is sitting on the vehicle seat 2 and the child passenger is sitting on the vehicle seat 2. In addition, the lateral width when the adult passenger is sitting on the vehicle seat under low temperature approximately equals to the lateral width when the child passenger is sitting on the vehicle seat under high temperature. This phenomena result from that the output of the pressure sensor 10 (cell 13) is changed as the temperature changes.

A determining process of the occupant detecting device in the embodiment according to the current invention will be explained with reference to flow charts in FIG. 16 and FIG. 17 in the company of a process of the controller 11.

According to the embodiment of the current invention, the CPU 21 basically compares the determining value corresponding to the total pressure value to a threshold in the determining process. The more the vehicle seat is likely to be occupied by the adult passenger, the more the determining value is increased by adding the coefficient (positive number) thereto. On the other hand, the more the vehicle seat is likely to be occupied by the child passenger or the CRS, the more the determining value is decreased by deducting the coefficient (positive number) therefrom. Based on such configuration, the vehicle seat condition whether the adult passenger is sitting thereon, or the child passenger is sitting or the CRS is installed thereon is determined from the determining value supposed to be corrected finally.

The determining process is repeatedly performed by interrupting at regular intervals of predetermined time. Once the determining process has begun, the CPU 21 executes a subroutine of a temperature correcting process in Step 101 in FIG. 16. The temperature correcting process will be specifically shown in FIG. 17. Step 201 inputs the temperature detected at the temperature sensor 12 and determines whether or not the detecting temperature is included in a range between the predetermined temperature T1 and the predetermined temperature T2, in other words, whether or not the detected temperature is a normal temperature. When Step 201 determines the detected temperature is in the range between the predetermined temperature T1 and the predetermined temperature T2, the CPU 21 goes to Step 203 and sets a predetermined threshold Th11 to an edge threshold TH1 as a default, a predetermined threshold Th21 to a lateral width threshold TH2 as a default, and a predetermined threshold Th31 to a determining value threshold TH3 as a default. FIG. 18 illustrates a graph showing an experimental result of a relationship between the temperature and the edge. According to FIG. 18, the predetermined threshold Th11 is set to be a preferable value for determining the condition of the vehicle seat 2 whether the small adult passenger is sitting thereon or the child passenger is sitting thereon based on the edge under normal temperature. FIG. 19 illustrates a graph showing an experimental result of a relationship between the temperature and the lateral width. According to FIG. 19, the predetermined threshold Th21 is set to be a preferable value for determining the condition of the vehicle seat 2 whether the small adult passenger is sitting thereon or the child passenger is sitting thereon based on the lateral width under normal temperature. FIG. 20 illustrates a graph showing an experimental result of a relationship between the temperature and the determining value according to the edge total pressure value. According to FIG. 20, the predetermined threshold Th31 is set to be a preferable value for determining the condition of the vehicle seat 2 whether the small adult passenger is sitting thereon or the child passenger is sitting thereon based on the determining value under norm al temperature.

On the other hand, when Step 201 determines the detected temperature is not in the range between the predetermined temperature T1 and the predetermined temperature T2, the CPU 21 goes to Step 202 and determines whether or not the detected temperature is equal to or more than the predetermined temperature T2. When the CPU 21 determines that the detected temperature is equal to or more than the predetermined temperature T2, the CPU goes to Step 204 and sets a predetermined threshold Th12 to the edge threshold TH1, a predetermined threshold Th22 to the lateral width threshold TH2, and a predetermined threshold Th32 to the determining value threshold TH3. As shown in FIG. 18, the predetermined threshold 12 is set to be a preferable value (<Th11) for determining the condition of the vehicle seat 2 whether the child passenger is sitting thereon or the small adult passenger is sitting thereon based on the edge under high temperature (actually, the small adult passenger is sitting under normal temperature). As shown in FIG. 19, the predetermined threshold 22 is set to be a preferable value (>Th21) for determining the condition of the vehicle seat 2 whether the child passenger is sitting thereon or the small adult passenger is sitting thereon based on the lateral width under high temperature (actually, the small adult passenger is sitting under normal temperature). As shown in FIG. 19, the predetermined threshold 32 is set to be a preferable value (>Th31) for determining the condition of the vehicle seat 2 whether the child passenger is sitting thereon or the small adult passenger is sitting thereon based on the determining value under high temperature (actually, the small adult passenger is sitting under normal temperature).

When the CPU 21 determines that the detected temperature is not equal to or more than the predetermined temperature T2 in Step 202, the CPU determines that the detected temperature is equal to or less than the predetermined temperature T1 and goes to Step 205. In Step 205, the CPU sets a predetermined threshold Th13 to the edge threshold TH1, a predetermined threshold Th23 to the lateral width threshold TH2, and a predetermined threshold Th33 to the determining value threshold TH3. As shown in FIG. 18, the predetermined threshold 13 is set to be a preferable value (>Th11) for determining the condition of the vehicle seat 2 whether the child passenger is sitting thereon or the small adult passenger is sitting thereon based on the edge under low temperature. As shown in FIG. 19, the predetermined threshold 23 is set to be a preferable value (<Th21) for determining the condition of the vehicle seat 2 whether the child passenger is sitting thereon or the small adult passenger is sitting thereon based on the lateral width under low temperature. As shown in FIG. 19, the predetermined threshold 33 is set to be a preferable value (<Th31) for determining the condition of the vehicle seat 2 whether the child passenger is sitting thereon or the small adult passenger is sitting thereon based on the determining value under low temperature.

After the predetermined threshold Th12, the predetermined threshold Th22, and the predetermined threshold Th32 has been set in any of Step 203 through 205, the CPU 21 goes back to the main routine shown in FIG. 16 and proceeds to Step 102. In step 102, the CPU inputs the data of the partial pressures X (i, j) detected at the cells 13 of the pressure sensor 10, and calculates the total pressure value by adding the all partial pressures X (i, j). In addition, the CPU 21 restores the obtained total pressure value in the memory as the determining value, then goes to Step 103.

In Step 103, the CPU 21 determines "human indicator". The meaning of "human indicator" will be explained as follows. Generally, the pressure distribution maps of the partial pressures X (i, j) detected at the vehicle seat 2 on each condition that the passenger is sitting thereon and the CRS is installed thereon have different characters. Specifically, a certain level of the partial pressure is detected at the cell provided at the center portion of the vehicle seat 2 on which the passenger is sitting, on the other hand, a certain level of the partial pressure is detected at the cell provided at the peripheral side of the vehicle seat 2 on which the CRS is installed. In other word, the pressure distribution of the partial pressures X (i, j) of the vehicle seat 2 on which the passenger is sitting has a reversed character of the pressure distribution of the partial pressures X (i, j) of the vehicle seat 2 on which the CRS is installed.

In the embodiment of the current invention, as shown in FIG. 15, a base pressure template TP comprehensively indicating the condition that the passenger is sitting on the vehicle seat 2, and setting a base pressure TEMP (i, j) at each cell 13 approximately preventing the tendency of the CRS obtained from the experimental value is stored in the ROM. The base pressure template TP indicates a distribution of the base pressure TEMP (i, j) being in an array of the 7×10 matrix corresponding to a shape of the pressure sensor 10. The average of the base pressure TEMP (i, j) provided at each cell 13 is set to a value of "zero". (In FIG. 15, actual pressure is illustrated for convenience.)

Then, the "human indicator" is calculated by summing up the products of the partial pressures X (i, j) detected at each cells 13 and the corresponding base pressures TEMP (i, j). In this case, when the partial pressure X (i, j) detected at each cell 13 and the base pressure TEMP (i, j) of the corresponding cell 13 have the same character, the value becomes a plus number, and the "human indicator" is increased. On the other hand, the partial pressure X (i, j) detected at each cell 13 and the base pressure TEMP (i, j) of the corresponding cell 13 indicate the reversed character, the value becomes a minus number, and the "human indicator" is decreased. Therefore, the CPU 21 detects whether or not the character of result of the pressure sensor 10 is similar to the character of the base pressure template TP based on the plus number or the minus number of the calculated "human indicator". That is, whether or not the passenger is sitting on the vehicle seat 2 is indicated by polarity of the "human indicator" (positive or negative).

In Step 103, the CPU detects whether or not the aforementioned "human indicator" is equal to or less than a predetermined threshold TH4. The predetermined threshold TH4 is set to be a preferable value showing that the vehicle seat is more likely to be not occupied by the adult passenger. When the "human indicator" is equal to or less than the predetermined threshold TH4, the CPU 21 determines that the passenger is not sitting on the vehicle seat (the CRS is installed thereon), then goes to Step 104. The CPU 21 deducts coefficient 1 from the determining value and sets the deducted value to the determining value, then goes to Step 105. On the other hand, when the "human indicator" is more than the predetermined threshold 4, the CPU 21 determines that the passenger is sitting on the vehicle seat, then goes to Step 105. Such correction of the determining value based on the "human indicator" results in reducing the number of misjudge that the CRS is installed on the vehicle seat when the adult passenger is sitting on the vehicle seat.

In Step 105, the CPU 21 determines whether or not the edge obtained by the aforementioned means is equal to or more than the edge threshold TH1 determined in any of Step 203 through Step 205. Needless to say, the influence from the temperature on edge determination has been already removed by setting the edge threshold TH1. The CPU 21 determined the adult passenger is not sitting on the vehicle seat 2 (the child passenger is sitting or the CRS is installed thereon) when the obtained edge is equal to or more than the predetermined edge threshold TH1, then goes to Step 106. The CPU 21 deducts coefficient 2 from the determining value and sets the deducted value to the determining value, then goes to Step 107. On the other hand, when the obtained edge is less than the predetermined edge threshold TH1, the CPU 21 determines that the adult passenger is sitting on the vehicle seat, then goes to Step 107. Such correction of the determining value based on the obtained edge results in reducing the number of misjudge assuming that the adult passenger is sitting on the vehicle seat when the adult passenger is not sitting on the vehicle seat.

In Step 107, the CPU 21 determines whether or not the lateral width obtained by the aforementioned means is equal to or more than the lateral width threshold TH2 determined in any of Step 203 through Step 205. Needless to say, the influence from the temperature on determination based on the lateral width has been already removed by setting the lateral width threshold TH2. The CPU 21 determines the condition of the vehicle seat on which the adult passenger is sitting thereon when the obtained lateral width is equal to or more than the predetermined lateral width threshold TH2, then goes to Step 108. The CPU 21 adds a coefficient 3 to the determining value and sets the deducted value to the determining value, then goes to Step 109. On the other hand, when the obtained edge is less than the predetermined lateral width threshold TH2, the CPU 21 determines that the adult passenger is not sitting on the vehicle seat, then goes to Step 109. Such correction of the determining value based on the obtained lateral width results in persuading the CPU 21 determines the condition of the vehicle seat on which the adult passenger is sitting.

In Step 109, the CPU 21 determines whether or not the determining value corrected by the aforementioned means is equal to or more than the determining threshold TH3 determined in any of Step 203 through Step 205. Needless to say, the influence from the temperature on determination based on determining value has been already removed by setting the determining threshold TH3. When the corrected determining value is equal to or more than the predetermined determining threshold TH3, the CPU 21 determines that the adult passenger is sitting on the vehicle seat, then goes to Step 110. In Step 110, the CPU 21 makes an "ON" decision for outputting a seating signal to permit (turn on) the actuation of the air bag. On the other hand, when the corrected determining value is less than the predetermined determining threshold TH3, the CPU 21 determines that the adult passenger is not sitting on the vehicle seat (the child passenger is sitting or the CRS is installed thereon), then goes to Step 111: In step 111, the CPU 21 makes an "OFF" decision for outputting a seating signal to not permit (turn off) the actuation of the air bag.

After making the "ON" or "OFF" decision in Step 110 or Step 111, the CPU 21 ends sitting operation for a moment. According to the embodiment of the current invention, following effects will be obtained.

(1) In the embodiment of the current invention, three different thresholds (Th11, Th12 and Th13) are set as the edge threshold TH1 based on the detected temperature for determining the condition of the vehicle seat whether or not the adult passenger is sitting thereon according to the comparison between the obtained edge and the edge threshold TH1. Thus, the accuracy of determining the condition of the vehicle seat 2 on which the adult passenger is sitting can be improved even if the output difference of the pressure sensor 10 (cell 13) and the hardness change of the urethane pad 5 are generated in responding to the temperature change.

(2) In the embodiment of the current invention, three different thresholds (Th21, Th22 and Th23) are set as the lateral width threshold TH2 based on the detected temperature for determining the condition of the vehicle seat whether or not the adult passenger is sitting thereon according to the comparison between the obtained lateral width and the lateral width threshold TH2. Thus, the accuracy of determining the condition of the vehicle seat 2 on which the adult passenger is sitting can be improved even if the output difference of the pressure sensor 10 (cell 13) is generated in responding to the temperature change.

(3) In the embodiment of the current invention, three different thresholds (Th31, Th32 and Th33) are set as the determining value threshold TH3 based on the detected temperature for determining the condition of the vehicle seat whether or not the adult passenger is sitting thereon according to the comparison between the obtained determining value and the determining value threshold TH3. Thus, the accuracy of determining the condition of the vehicle seat 2 on which the adult passenger is sitting can be improved even if the output difference of the pressure sensor 10 (cell 13) is generated in responding to the temperature change.

(4) In the embodiment of the current invention, the edge threshold TH1, the lateral width threshold TH2 and the determining value threshold TH3 can be set respectively according to each range in which the detected temperature is included for correcting the influences from the temperature, as a result, the load on calculation can be reduced.

The embodiment of the current invention is not limited to the aforementioned configuration and may be changed as follows. In the embodiment of the current invention, the determining value threshold TH3 is set to be three different kinds of values depending on the temperature change. However, as shown in FIG. 20, influence from the temperature change is approximately eliminated from the determining value obtained by correcting the total pressure value. The CPU 21 can determine the condition of the vehicle seat on which the adult passenger is sitting, or the child passenger is sitting or the CRS is installed if the threshold is set to be the fixed default value (the determining value threshold TH31), in other words, the determining value threshold TH3 may not be changed depending on the temperature change. Thus, the process of setting the determining value threshold TH3 can be skipped.

In the embodiment of the current invention, temperature has been classified in three different ranges (low temperature, normal temperature and high temperature), and the edge threshold TH1, the lateral width threshold TH2 and the determining value threshold TH3 are changed based on such temperature ranges, however, the number of the temperature ranges may be changed to any other plural numbers. In addition, the edge threshold TH1, the lateral width threshold TH2 and the determining value threshold TH3 may be changed to a value in proportion to the temperature detected by the temperature sensor 12. The vehicle seat condition can be determined more precisely by this means.

In the embodiment of the current invention, the edge threshold TH1, the lateral width threshold TH2 and the determining value threshold TH3 are corrected based on the temperature change, however, criteria of judgment can be changed. Therefore, the edge, lateral width and the determining value may be corrected alternatively or additionally.

In the embodiment of the current invention, the determining value obtained based on the total pressure value is compared to the determining value threshold TH3 for determining the vehicle seat condition whether or not the adult passenger is sitting thereon. Such determining value can be obtained based on an "On" cell number, the number of the cells whose partial pressure detected by the pressure sensor exceeds a predetermined pressure. The "On" cell number corresponds to a pressure sensitive area at the pressure sensor 10. In this case, the threshold value is corrected based on temperature. Furthermore, the "On" cell number (determining value) may be corrected alternatively or additionally.

In the embodiment of the current invention, the edge is obtained referring to the cells located next to a certain cell in width direction and cross direction of the vehicle seat 2, however, cells located diagonally across the certain cell can be referred to obtain the edge alternatively or additionally.

In the embodiment of the current invention, the edge value of a certain cell may be calculated from an arithmetic average value, geometrical average value or harmonic average value of the partial pressures of the cells located around the certain cell. In the embodiment of the current invention, the coefficient 2 is deducted from the determination value when it is determined that the adult passenger is sitting on the vehicle seat based on the comparison between the edge and the edge threshold TH1, however, the condition of the vehicle seat 2 on which the adult passenger is sitting can be determined from this comparison result without depending on the determining value.

In the embodiment of the current invention, the partial pressures of three continuing rows in the array of the cells 13 are summed up and compared for detecting the peak row to calculate the lateral width value, however, the number of the continuing rows may be changed to other plural number unless being less than the total number of the rows in the array of the cells 13.

In the embodiment of the current invention, the peak row may not be the center row in the continuing three rows in the array of the cells 13. The peak row may be the other row in the continuing three rows of the vehicle seat 2.

In the embodiment of the current invention, the lateral width value obtained by comparing to the width threshold NH when the adult passenger is sitting on the vehicle seat in normal posture, however, when the adult passenger is sitting on the vehicle seat disproportionately in the width direction of the vehicle seat 2 (the pressure is biased in the width direction of the vehicle seat), the width threshold NH may be moved in the corresponding direction.

In the embodiment of the current invention, the coefficient 3 is added to the determining value when it is determined that the adult passenger is sitting on the vehicle seat by the comparison between the edge and the edge threshold TH1, however, the condition of the vehicle seat 2 on which the adult passenger is sitting can be determined from this comparison result without depending on the determining value.

In the embodiment of the current invention, the pressure sensor 10 has a matrix structure defined by a two-dimensional array of rows in the width direction of the vehicle seat and columns in the cross direction of the vehicle seat being crossing at right angles. Such rows and columns may not be crossing at right angles unless the pressure distribution of the seating surface of the vehicle seat has ordinality.

(a). According to the aforementioned embodiment, an occupant detecting device according to claim 3 further comprises a deviation determining means for detecting a deviation of the pressure in the width direction applied to the vehicle seat, wherein the lateral width calculating means calculates the lateral width in reference to the width threshold being set at a position off by the deviation determined by the deviation determining means in the width direction of the vehicle seat.

In this configuration, the lateral width is calculated in reference to the lateral width threshold set at a position off by the deviation determined by the biased pressure determining means in the width direction of the vehicle seat, as a result the seat condition is determined more precisely based on the lateral width.

(b). According to the aforementioned embodiment, an occupant detecting device comprises plural cells provided at a seating part of a seat in an array defined by rows in a width direction of the vehicle seat and columns in a cross direction of the vehicle seat for detecting partial pressures, an "ON" cell number calculating means for obtaining a "ON" cell number by counting the number of the cells whose partial pressure exceeds a predetermined pressure, a determining means for determining a condition of the vehicle seat on which an adult passenger is sitting based on a comparison result between the obtained "ON" cell number and a determining threshold for "ON" cell number, a temperature sensor for detecting temperature, and a correcting means for correcting at least one of either the "ON" cell number obtained based on the detected temperature or the determining threshold for "ON" cell number.

In such configuration, at least one of either the "ON" cell number obtained based on the detected temperature or the threshold value for "ON" cell number is corrected, as a result, the seat condition is determined more precisely based on the temperature.

(c). According to the aforementioned embodiment, the occupant detecting device further includes the correcting means sets the threshold respectively in response to the range where the detected temperature is included.

In such configuration, the detected temperature can be corrected based on the different threshold, as a result, the load on calculation can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

What is claimed is:

1. An occupant detecting device comprising:
   plural cells provided at a seating part of a vehicle seat and defined by an array of rows in a width direction of the vehicle seat and columns in a cross direction of the vehicle seat for detecting partial pressures of the seating part;
   a pad provided in the seating part of the vehicle;
   a peak row detecting means for calculating a total partial pressure of a predetermined number of rows continuing in a column direction and for defining as a peak row any row of the predetermined number of rows having a maximum total;
   a lateral width calculating means for calculating each total of the partial pressures of cells per column in the predetermined number of rows, for comparing the obtained total of the partial pressures per column to a predetermined width threshold per column, and for obtaining the lateral width by counting the number of the column in which the total pressure exceeds the corresponding predetermined width threshold per column;
   a determining means for determining a condition of the vehicle seat on which a passenger is sitting based on a comparison result between the obtained lateral width and a lateral width threshold;
   a temperature sensor for detecting temperature of the seating part of the vehicle seat; and
   a correcting means for correcting at least one of either the obtained lateral width or the lateral width threshold based on the temperature detected by the temperature sensor in consideration of change of hardness of the pad being influenced by temperature change.

2. An occupant detecting device according to claim 1, wherein the correcting means sets the lateral width threshold in response to a range that includes the detected temperature.

3. An occupant detecting device according to claim 1, further comprising a deviation determining means for detecting a deviation of the pressure in the width direction applied to the vehicle seat, wherein the lateral width calculating means calculates the lateral width in reference to the predetermined width threshold per column being moved by the deviation determined by the deviation determining means in the width direction of the vehicle seat.

4. An occupant detecting device according to claim 3, wherein the correcting means sets the lateral width threshold in response to a range that includes the detected temperature.

5. An occupant detecting device according to claim 1, wherein the correcting means corrects at least one of either the obtained lateral width or the lateral width threshold based on the temperature detected by the temperature sensor in consideration of change of outputs of the plural cells being influenced from temperature change.

6. An occupant detecting device according to claim 1 wherein the occupant detecting devices comprises:
   total pressure value calculating means for obtaining a total pressure value by summing up the detected partial pressures;
   edge calculating means for obtaining an edge value by summing up all differences between the partial pressure detected at each cell and an average partial pressure obtained by averaging the partial pressures detected at cells located next to each cell to obtain a total difference, and dividing the obtained total difference by the total pressure value obtained by the total pressure value calculating means; and
   determining means for determining a condition of the vehicle seat on which an adult passenger is sitting based on a comparison result between the obtained edge value and an edge threshold.

7. An occupant detecting according to claim 6, wherein the correcting means corrects the edge threshold so that the edge threshold is set to be a preferable value for determining the condition of the vehicle seat whether a small adult passenger is sitting thereon or a child passenger is sitting thereon based on the edge under a first temperature range, a second temperature range higher than the first temperature range or a third temperature range lower than the first temperature range.

8. An occupant detecting according to claim 1, wherein the correcting means corrects the lateral width threshold so that the width threshold is set to be a preferable value for determining the condition of the vehicle seat whether a small adult passenger is sitting thereon or a child passenger is sitting thereon based on the lateral width under a first temperature range, a second temperature range higher than the first temperature range or a third temperature range lower than the first temperature range.

9. An occupant detecting according to claim 1, wherein the correcting means corrects the lateral width threshold by selecting a threshold, corresponding to the temperature measured by temperature sensor, from thresholds set based on a change of hardness influenced by temperature change.

* * * * *